United States Patent

Paes

(10) Patent No.: US 12,221,285 B2
(45) Date of Patent: Feb. 11, 2025

(54) METHOD AND APPARATUS FOR TRANSPORTING METALLIC CONTAINERS USING ELECTRO ADHESION

(71) Applicant: Ball Corporation, Westminster, CO (US)

(72) Inventor: Leonardo Jose Paes, Sao Jose dos Campos (BR)

(73) Assignee: Ball Corporation, Westminster, CO (US)

(*) Notice: Subject to any disclaimer, the term of this patent is extended or adjusted under 35 U.S.C. 154(b) by 98 days.

(21) Appl. No.: 18/064,126

(22) Filed: Dec. 9, 2022

(65) Prior Publication Data

US 2023/0183014 A1 Jun. 15, 2023

Related U.S. Application Data

(60) Provisional application No. 63/288,413, filed on Dec. 10, 2021.

(51) Int. Cl.
*B65G 17/46* (2006.01)
*B65G 43/00* (2006.01)

(52) U.S. Cl.
CPC ............. *B65G 17/46* (2013.01); *B65G 43/00* (2013.01); *B65G 2201/0235* (2013.01); *B65G 2203/042* (2013.01); *B65G 2812/02227* (2013.01)

(58) Field of Classification Search
None
See application file for complete search history.

(56) References Cited

U.S. PATENT DOCUMENTS

| 9,486,814 | B2* | 11/2016 | Prahlad | ............... B03C 7/08 |
| 9,776,796 | B2* | 10/2017 | Tanz | ............... B65G 43/00 |
| 9,987,755 | B2* | 6/2018 | Prahlad | ............... B65G 13/075 |
| 10,421,613 | B2* | 9/2019 | Prahlad | ............... B65G 54/02 |

(Continued)

FOREIGN PATENT DOCUMENTS

EP 3517461 7/2019

OTHER PUBLICATIONS

"A General Guide to Conveyor Systems," Liquid Packaging Solution, Inc., as of May 16, 2021, 2 pages [retrieved online Feb. 3, 2023 from: web.archive.org/web/20210516015158/https://www.liuidpackagingsolution.com/news/a-general-guide-to-conveyor-systems].

(Continued)

*Primary Examiner* — Kavel Singh
(74) *Attorney, Agent, or Firm* — Sheridan Ross P.C.

(57) ABSTRACT

An electro adhesion (EA) conveyor system for transporting a metallic container includes at least one electro adhesion (EA) pad. The EA pad includes at least one positive electrode and at least one negative electrode arranged in a predetermined pattern. The predetermined pattern is configured to generate an electric field when a voltage is applied to one or more of the at least one positive electrode or the at least one negative electrode. The EA conveyor system includes a conveyor belt operable to transport the metallic container between a first position and a second position. The metallic container is held against the conveyor belt via EA generated by the EA pad during transportation. The EA conveyor system may be adjusted by a control unit of a control system based on production line information such as operational data received from sensors.

20 Claims, 8 Drawing Sheets

(56) References Cited

U.S. PATENT DOCUMENTS

| | | | |
|---|---|---|---|
| 10,800,044 B2* | 10/2020 | Fourney | B65G 17/46 |
| 2013/0292303 A1 | 11/2013 | Prahlad et al. | |
| 2013/0294875 A1 | 11/2013 | Prahlad et al. | |
| 2015/0368049 A1* | 12/2015 | Berghorn | B65G 47/945 |
| | | | 198/370.04 |
| 2016/0280464 A1 | 9/2016 | Tanz | |

OTHER PUBLICATIONS

Inside a Ball Beverage Can Plant, Ball, Sep. 2002, 1 page [retrieved online from: www.ball.com/Ball/media/Ball/Global/Downloads/How_a_Ball_Metal_Beverage_Can_Is_Made.p df?ext =. pdf].

Guo et al. "Geometric Optimisation of Electroadhesive Actuators Based on 3D Electrostatic Simulation and its Experimental Verification," IFAC—PapersOnLine, 2016, vol. 39, Issue 21, pp. 309-315.

International Search Report and Written Opinion for International (PCT) Patent Application No. PCT/US22/81308, dated Apr. 7, 2023 17 pages.

International Preliminary Report on Patentability for International (PCT) Patent Application No. PCT/US2022/081308, dated Jun. 20, 2024 12 pages.

* cited by examiner

METHOD AND APPARATUS FOR TRANSPORTING METALLIC CONTAINERS USING ELECTRO ADHESION

CROSS-REFERENCE TO RELATED APPLICATIONS

This application claims priority to U.S. Provisional Application No. 63/288,413, filed on Dec. 10, 2021, and entitled "METHOD AND APPARATUS FOR TRANSPORTING METALLIC CONTAINERS USING ELECTRO ADHESION", the entirety of which is hereby incorporated by reference.

FIELD

The present disclosure generally relates to the transportation of metallic containers. More specifically, the present disclosure relates to methods and apparatus of transporting metallic containers using electro adhesion within production lines, while reducing electricity consumption and promoting sustainability in metallic container manufacturing facilities.

BACKGROUND

Metallic containers offer distributors and consumers many benefits. The body of a metallic container provides enhanced protection properties for beverages and foodstuffs. The surfaces of metallic containers are also ideal for decorating with brand names, logos, designs, product information, and/or other preferred indicia for identifying, marketing, and distinguishing the metallic container and its contents from other products and competitors. Thus, metallic containers offer bottlers, distributors, and retailers an ability to stand out at the point of sale.

Additionally, many consumers prefer metallic containers compared to containers made of glass or plastic. Metallic containers are particularly attractive to consumers because they are recyclable, lightweight, and efficient. Metallic containers are suitable for use in public places and outdoors because they are more durable than glass containers. Further, some consumers avoid plastic containers due to concerns that the plastic may leach chemicals into consumable products.

As a result of these and other benefits, sales of metallic containers were valued at approximately $53 billion globally in 2014. A large percentage of the metallic container market is driven by beverage containers. According to one report, approximately 290 billion metallic beverage containers were shipped globally in 2012. One U.S. trade group reported that 126 billion metallic containers were shipped in the U.S. alone in 2014. To meet this demand, metallic container manufacturing facilities operate some of the fastest and most efficient production lines in the container industry. Accordingly, specialized equipment is required for many of the high-speed operations performed to form the metallic containers.

In some instances, metallic containers may be formed on a production line using a draw and wall ironing (DWI) process. An example of a known production line to produce DWI metallic containers is generally illustrated and described in "Inside a Ball Beverage Can Plant," available at http://www.ball.com/Ball/media/B all/Global/Downloads/How_a_Ball_Metal_Beverage_Can_Is_Made.pdf?ext=.pdf (last visited Aug. 16, 2021), which is incorporated herein by reference in its entirety. In one example of a production line, a cupper cuts circular blanks from a lubricated aluminum sheet and forms the blanks into cups. Bodymakers use a punch on a ram to push the cups through a series of tooling dies that redraw and iron the cups into container bodies, with the open ends of the container bodies cut to a uniform height by trimmers. The container bodies are then washed and rinsed with a washer, and dried with an oven. The exterior sidewalls may be given a basecoat with a basecoater and dried in an oven. The exterior sidewalls are then decorated with one or more decorators, the rim is coated with a lacquer by a bottom coater, and the interior sidewalls are coated with a lacquer with an internal coater, all of which are dried in one or multiple ovens. A waxer applies a thin coat of lubricant to the outside of the metallic container prior to die necking, which shapes the neck of the metallic container. The metallic container may be reprofiled or reformed as desired before being tested, inspected, and palletized.

In some instances, metallic containers may be formed on a production line using an impact extrusion process. Impact extrusion is a process utilized to make metallic containers and other articles with unique shapes. The products are typically made from a softened metal slug comprised of steel, magnesium, copper, aluminum, tin, and lead and other alloys. The container is formed inside a confining die from a cold slug that is contacted by a punch. The force from the punch deforms the metal slug around an outer diameter of the punch and the inner diameter of the confining die. After the initial shape is formed, the container is removed from the punch with a counter-punch ejector, and other necking and shaping tools are used to form the device to a preferred shape. In an example embodiment, the neck portion may be formed by a machine known as a "necker". After the container body is formed into its cylindrical shape, dies of the necker apply pressure to the upper end of the container body to reshape the open end and form the neck. To form the neck, the container body typically passes progressively through several neckers arranged in series. In one embodiment following the formation of the neck portion, a thread is applied to a section of the neck portion. In an alternative embodiment following the formation of the neck portion, a neck with a flange is formed to receive an end closure, a pump mechanism, an aerosol discharge valve, etc. The metallic containers may be capped with a closure including, but not limited to, a Roll-On Pilfer Proof (ROPP) closure, a crown closure, or a threaded cosmetic pump closure.

The above-described examples of metallic container production lines may use dozens of pieces of equipment to perform all the above steps, with conveyor systems transporting the metallic containers in various stages of completion between the input and output of each piece of equipment. The conveyor systems may be designed to buffer the metallic containers to prevent damage during transport. The conveyor systems may be configured to transport the metallic containers at numerous angles due to the layout of the production line, including horizontally or substantially horizontally relative to a manufacturing floor, up or down along a sloped surface along an incline or decline defined relative to the manufacturing floor, and/or vertically or substantially vertically relative to the manufacturing floor. For example, equipment operable to perform subsequent steps may be on different levels of the container manufacturing facility, such that metallic containers need to be transported in a vertical direction to and/or from the higher-level equipment.

To accomplish the vertical direction of transportation, the container manufacturing facility may include elevators and "lowerators." For example, the elevator and/or the lowerator may include a tunnel track, which moves metallic containers in a single file. By way of another example, an elevator and/or the lowerator may include a vacuum conveyor system. FIG. 1 depicts an example vacuum conveyor system 100. As depicted in FIG. 1, a blower generates negative pressure to hold and lift metallic containers 102 (e.g., cans or cups, or the like) onto a conveyor belt 104 during transportation from a first level to a second level having a different elevation. For example, the first level may be lower in elevation (or lower z-value) than the second level, or may be higher in elevation (or higher z-value) than the second level. The blower may include a motor coupled to a reducer which, in turn, is connected to a fan. The fan generates a predetermined amount of negative pressure in the elevator, proportionally to their rotation (e.g., which may be a frequency set in an inverter).

Given the operating time of the production line, the elevators may need to be turned on for periods of time that often include a full twenty-four hour day. The elevators may include a flow control so that they do not damage or drop the metallic containers due to an excess of vacuum or a lack of vacuum. As such, an elevator such as a vacuum conveyor system may be constantly running, resulting in large amount of electricity or power usage. In addition, the vacuum conveyor system may generate large amounts of noise pollution from components such as the blower and/or the fan. Further, generating (or re-generating) the vacuum after the fans and blowers have been turned off may take a large amount of time, which in turn may result in the manufacturing facility being subject to a considerable period of downtime. Further, the complexity or costly type or number of components in the vacuum conveyor system may cause maintenance issues and/or have reliability issues.

SUMMARY

Accordingly, there is a need for methods and apparatus of transporting metallic containers that will transport the metallic containers without causing damage to the metallic containers. The metallic containers should be transportable on horizontal or substantially horizontal surfaces, sloped surfaces along an incline, decline, and vertical or substantially vertical surfaces. The metallic containers should be held in place to counter the application of external forces such as gravity during transportation that may cause the metallic containers to make contact or overturn, resulting in mashing, scuffing, deforming, contact marks, or the like on the metallic containers when contact occurs. There is also a need for methods and apparatus of transporting metallic containers that reduce electricity consumption and promote sustainability in metallic container manufacturing facilities.

It is one aspect of the present disclosure to provide methods and apparatus for transporting a metallic container using electro adhesion, and more specifically to provide methods and apparatus of transporting a metallic container using electro adhesion within production lines, while reducing electricity consumption and promoting sustainability in metallic container manufacturing facilities. Electro adhesion (EA) may require less energy or power (e.g., electricity) than a conventional vacuum conveyor system. In addition, EA may produce less noise pollution than a conventional vacuum conveyor system, noting that the noise pollution from the conventional vacuum conveyor system may create an industrial exposure hazard potentially resulting in hearing loss. Further, EA may require less initiation time when started as compared to a conventional vacuum conveyor system, reducing downtime in the manufacturing facility. Further, EA may require a less complex or costly type or number of components than conventional vacuum conveyor systems, which may result in less maintenance and be increased reliability within the manufacturing facility.

Electro adhesion (EA) is the electrostatic attraction generated between objects in contact and with an electrical potential difference applied between them due to arranged positive and negative electrodes. An EA application may require four components: (1) the EA pad with a defined and/or optimized conductor pattern for each application, (2) a substrate that is an object or surface to be attached, (3) a power supply that can be direct current (DC) or alternating current (AC), and (4) a control system to optimize and control coupling and decoupling.

In some embodiments, to induce EA, the EA pad is subjected to a voltage (e.g., ranging between 5 kilovolts (kV) and 10 kV). The EA pad structure is composed of electrodes spaced according to standards defined in literature, and generates an electric field between the conductors. For example, EA pads may be manufactured using PCBs (printed circuit boards) or flexible PCBs, with chemically etched copper laminates on the plate that are covered with a dielectric film or varnish. In one non-limiting example, the electrodes may be arranged in an alternating positive and negative pattern. When the statically charged EA pad is brought closer to the substrate, an attraction force is generated.

Variables taken into consideration to achieve satisfactory EA include, but are not limited to, environmental factors, parameters of the conductors used in creating the EA pads, parameters of the power source used in the application, the substrate material to be attached, and the like. It is noted static loading of the EA pad and substrate may vary in time and/or charge, where the static loading is created by inducing alternating positive and negative charges on adjacent electrodes, where the positive and negative charges generate opposite charges on the substrate that the EA pad touches, resulting in attraction between the EA pad and the substrate. For example, although the static loading of the metallic containers may be performed during transport (e.g., on-the-fly), the static loading of the EA pad may vary from a few milliseconds to hours, depending on the strength of the EA. In addition, it is noted the attraction force decays until the moment that decoupling occurs when the voltage is removed. A discussion about optimizing electrodes patterns and EA pad geometries may be found in J. Guo, et al. Geometric Optimisation of Electroadhesive Actuators Based on 3D Electrostatic Simulation and its Experimental Verification, IFAC-PapersOnLine, Volume 49, Issue 21, 2016, Pages 309-315, ISSN 2405-8963, https://doi.org/10.1016/j.ifacol.2016.10.574, which is incorporated herein by reference in its entirety.

Systems that use EA have a wide range of applications due to the possibility to move and lift almost any type of material and surface. In addition, EA can be used in applications in dusty and low-pressure environments, where conventional vacuum conveyor systems may be otherwise affected. Further, EA systems are remarkably simple as they contain light mechanical materials and simple assembly structures, as well as simplified and energy-efficient control systems. Further, EA systems have power consumption in the microwatt ($\mu W$) to milliwatt (mW) ranges, with current in micro-amperes ($\mu A$) or milli-ampere (mA) ranges and voltage in kV ranges.

In one embodiment of the present disclosure, an electro adhesion (EA) conveyor system for transporting a metallic container in a production line includes an electro adhesion (EA) pad. The EA pad includes at least one positive electrode and at least one negative electrode arranged in a predetermined pattern. The predetermined pattern is configured to generate an electric field when a voltage is applied to one or more of the at least one positive electrode or the at least one negative electrode. The EA conveyor system includes a conveyor belt of a metallic container production line. The conveyor belt is positioned proximate to the EA pad and operable to transport the metallic container between a first position and a second position. The metallic container is held against the conveyor belt via EA generated by the EA pad during transportation. In some embodiments, the EA conveyor system utilizes a wattage formed from current ranging between 1 µA and 1 mA, and a voltage ranging between 1 kV and 30 kV. In one non-limiting example, the voltage may range from 5 kV to 10 kV.

In some embodiments, the system includes a conveyor motor configured to cause the conveyor belt to actuate. Actuation of the conveyor belt in combination with the electric field generated by the EA pad transports the metallic container between the first position and the second position. In additional embodiments, the system includes a power supply configured to apply the voltage to one or more of the at least one positive electrode or the at least one negative electrode.

In additional embodiments, at least one of the power supply or the conveyor motor is adjustable based on at least one control signal generated by at least one control unit of a control system. The at least one control unit is communicatively coupled to at least one sensor installed within the production line. The at least one control signal is generated by the control unit based on operational data received from the at least one sensor.

In additional embodiments, the first position corresponds to an output of a first piece of equipment of the production line operable to perform a first operation. The second position corresponds to an input of a second piece of equipment of the production line operable to perform a second operation after the first operation. The at least one sensor is installed within or proximate to the first piece of equipment, the second piece of equipment, at least a third piece of equipment of the production line located upline from the first piece of equipment or downline from the second piece of equipment, or said conveyor belt.

In some embodiments, the EA pad is stationary. The conveyor belt is configured to move past the stationary EA pad when transporting the metallic container. In other embodiments, the conveyor belt and the EA pad operate to retain the metallic container against a surface of the conveyor belt and transport the metallic container.

In some embodiments, the second position of the conveyor belt is at an increased elevation or a decreased elevation relative to the first position. The conveyor belt includes a leading surface that is sloped or vertical. The conveyor belt is configured to transport the metallic container along the sloped or vertical leading surface. In additional embodiments, the conveyor belt may be a closed loop formed with the leading surface and a return surface.

In another embodiment of the present disclosure, a method for transporting a metallic container via electro adhesion in a production line may include, but is not limited to, generating electro adhesion (EA) with an EA pad. The EA pad includes at least one positive electrode and at least one negative electrode arranged in a predetermined pattern. The predetermined pattern is configured to generate an electric field when a voltage is applied by a power supply to one or more of the at least one positive electrode or the at least one negative electrode. The method for transporting a metallic container via electro adhesion may include, but is not limited to, receiving the metallic container from a first position via a conveyor belt. The conveyor belt is actuatable via a conveyor motor. The conveyor belt is positioned proximate to the EA pad. The method for transporting a metallic container via electro adhesion may include, but is not limited to, transporting the metallic container between the first position and a second position via the conveyor belt. The metallic container is held against the conveyor belt via the generated EA during transportation. The method for transporting a metallic container via electro adhesion may include, but is not limited to, providing the metallic container at the second position via the conveyor belt.

In some embodiments, the EA conveyor system utilizes a wattage formed from current ranging between 1 µA and 1 mA, and a voltage ranging between 1 kV and 30 kV. In one non-limiting example, the voltage may range from 5 kV to 10 kV.

In some embodiments, the method may include, but is not limited to, acquiring operational data via at least one control unit. The method may include, but is not limited to, adjusting at least one operational parameter based on the acquired operational data.

In some embodiments, the first position of the conveyor belt corresponds to an output of a first piece of equipment of the production line operable to perform a first operation. The second position of the conveyor belt corresponds to an input of a second piece of equipment of the production line operable to perform a second operation after the first operation. In another embodiment of the present disclosure, a production line for transporting metallic container via electro adhesion includes a first piece of equipment adapted to perform a first operation. The production line includes a second piece of equipment operable to perform a second operation after the first operation. In some embodiments, the first operation and/or the second operation may be processes or steps for the transporting of metallic container stock, for the forming of the metallic container from the metallic container stock, and/or for the transporting of the metallic container following completion to additional downstream palletizing or packaging processes. The production line includes an electro adhesion (EA) conveyor system for transporting the metallic container between a first position corresponding to the first piece of equipment and a second position corresponding to the second piece of equipment. The EA conveyor system for transporting a metallic container includes an electro adhesion (EA) pad. The EA pad includes at least one positive electrode and at least one negative electrode arranged in a predetermined pattern. The predetermined pattern is configured to generate an electric field when a voltage is applied to one or more of the at least one positive electrode or the at least one negative electrode. The electro EA conveyor system includes a conveyor belt configured to transport the metallic container between the first position and the second position. The metallic container is held against the conveyor belt via EA generated by the EA pad during transportation. In some embodiments, the EA conveyor system utilizes a wattage formed from current ranging between 1 µA and 1 mA, and a voltage ranging between 1 kV and 30 kV. In one non-limiting example, the voltage may range from 5 kV to 10 kV.

In some embodiments, the production line includes at least one sensor installed within or proximate to the first piece of equipment, the second piece of equipment, at least a third piece of equipment located upline from the first piece of equipment or downline from said second piece of equipment, or the EA conveyor system. The production line includes a control unit of a control system. The control unit is communicatively coupled to said at least one sensor.

In additional embodiments, the EA conveyor system includes a conveyor motor configured to cause the conveyor belt to actuate. Actuation of said conveyor belt in combination with the electric field generated by said EA pad transports the metallic container between the first position and the second position. In additional embodiments, the EA conveyor system includes a power supply configured to apply voltage to one or more of the at least one positive electrode or the at least one negative electrode.

In additional embodiments, the control unit is communicatively coupled to one or more of the conveyor motor or the voltage power supply. The control unit is configured to generate at least one control signal to adjust at least one operational parameter of at least one of said power supply or the conveyor motor based on operational data received from the at least one sensor.

In some embodiments, the EA pad is stationary. The conveyor belt is configured to move past the stationary EA pad when transporting the metallic container.

In some embodiments, the EA pad is positioned within the conveyor belt. The conveyor belt and the EA pad both operate to retain the metallic container against a surface of the conveyor belt and transport the metallic container.

In some embodiments, the second position of the conveyor belt is at an increased elevation relative to the first position. The conveyor belt includes a leading surface that is sloped or vertical, and the conveyor belt is operable to transport the metallic container along the sloped or vertical leading surface.

In another embodiment of the present disclosure, one or more sensors are operable to generate data about the operation of various pieces of equipment in the production line. One or more control units of a control system are operable to receive the data and generate control signals to adjust operational parameters of at least one of the power supply used to generate the electric field for EA and/or the conveyor motor used to actuate the conveyor belt.

It is noted "metallic container" may represent a cup (e.g., including, but not limited to, a tapered cup), a can, a bottle, or another metallic device capable of being transported via electro adhesion. In addition, it is noted the "metallic container" may be transported in a fully fabricated or completed state, or transported in an incomplete state between production operations. Further, it is noted the metallic container may be any container able to hold beverages, food, or other items requiring containment. Further, it is noted the metallic container may be partially or fully recyclable.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more", and "at least one" can be used interchangeably herein.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, angles, ranges, and so forth used in the specification and claims may be increased or decreased by approximately 5% to achieve satisfactory results. In addition, where the meaning of the terms "about" or "approximately" as used herein would not otherwise be apparent to one of ordinary skill in the art, the terms "about" and "approximately" should be interpreted as meaning within plus or minus 10% of the stated value.

The term "parallel" means two objects are oriented at an angle within plus or minus 0° to 5° unless otherwise indicated. Similarly, the term "perpendicular" means two objects are oriented at angle of from 85° to 95° unless otherwise indicated. Unless otherwise indicated, the term "substantially" indicates a different of from 0% to 5% of the stated value is acceptable.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all the equivalents thereof. Further, the structures, materials, or acts and the equivalents thereof shall include all those described in the Summary, Brief Description of the Drawings, Detailed Description, Abstract, and Claims themselves.

Unless otherwise stated, any embodiment described throughout the disclosure should be understood as being individually implementable and/or combinable with any other embodiment or embodiments described throughout the disclosure.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s). In the drawings.

Figure 1:
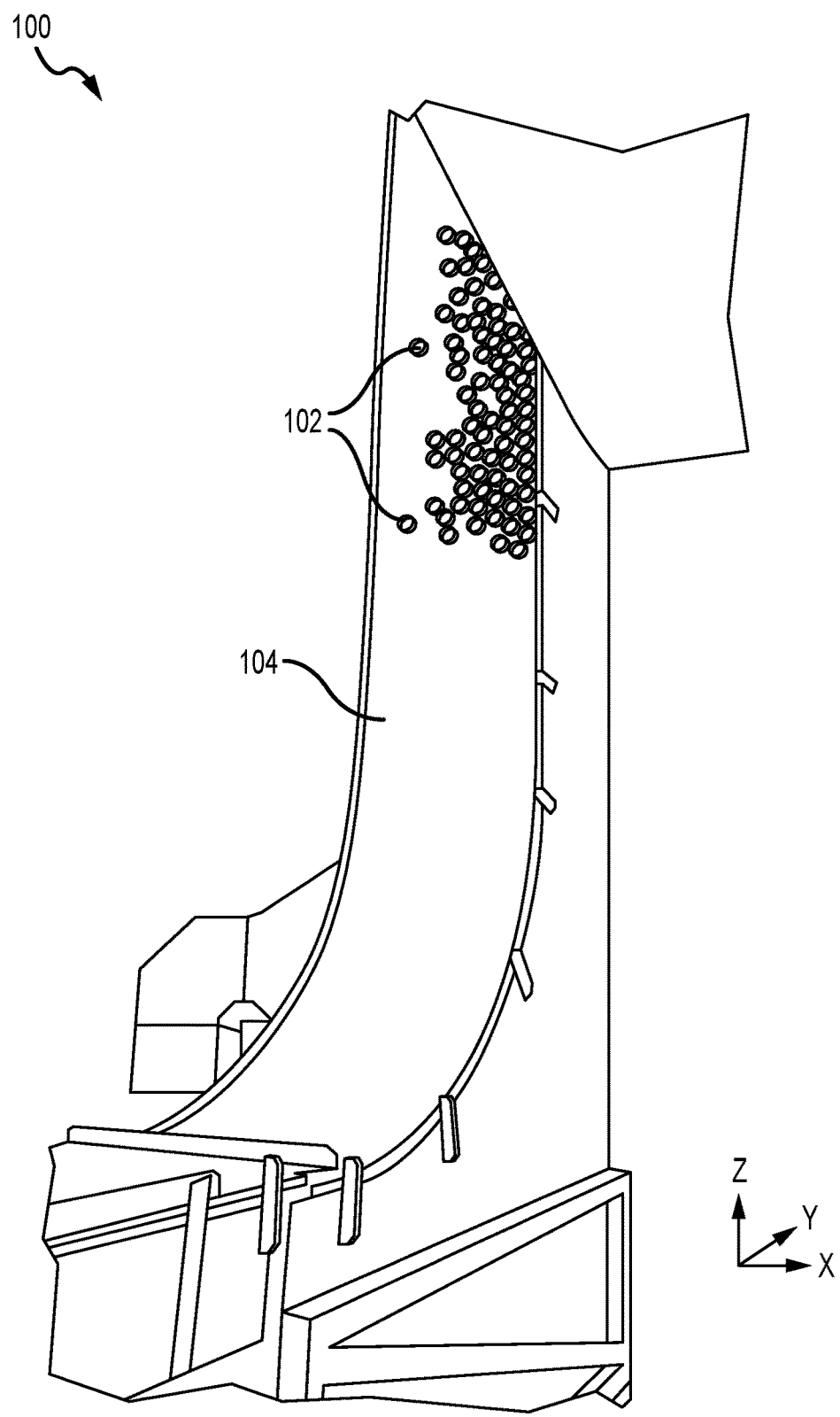
FIG. 1 depicts an example vacuum conveyor belt system known in the art for transporting metallic containers from a first position to a second position.
Figure 2A:
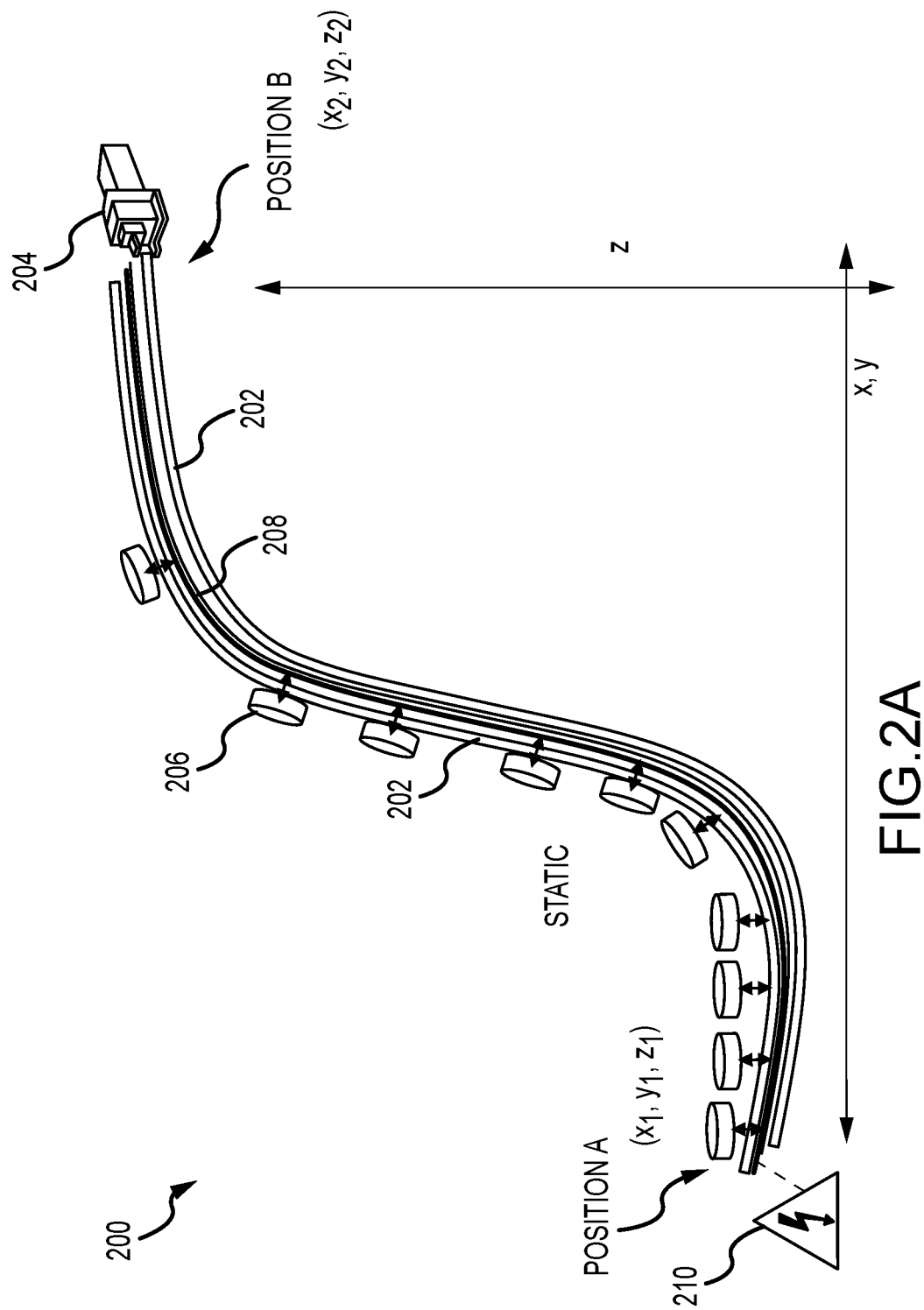
FIG. 2A depicts an electro adhesion (EA) conveyor system including a conveyor belt and an electro adhesion (EA)
Figure 2B:
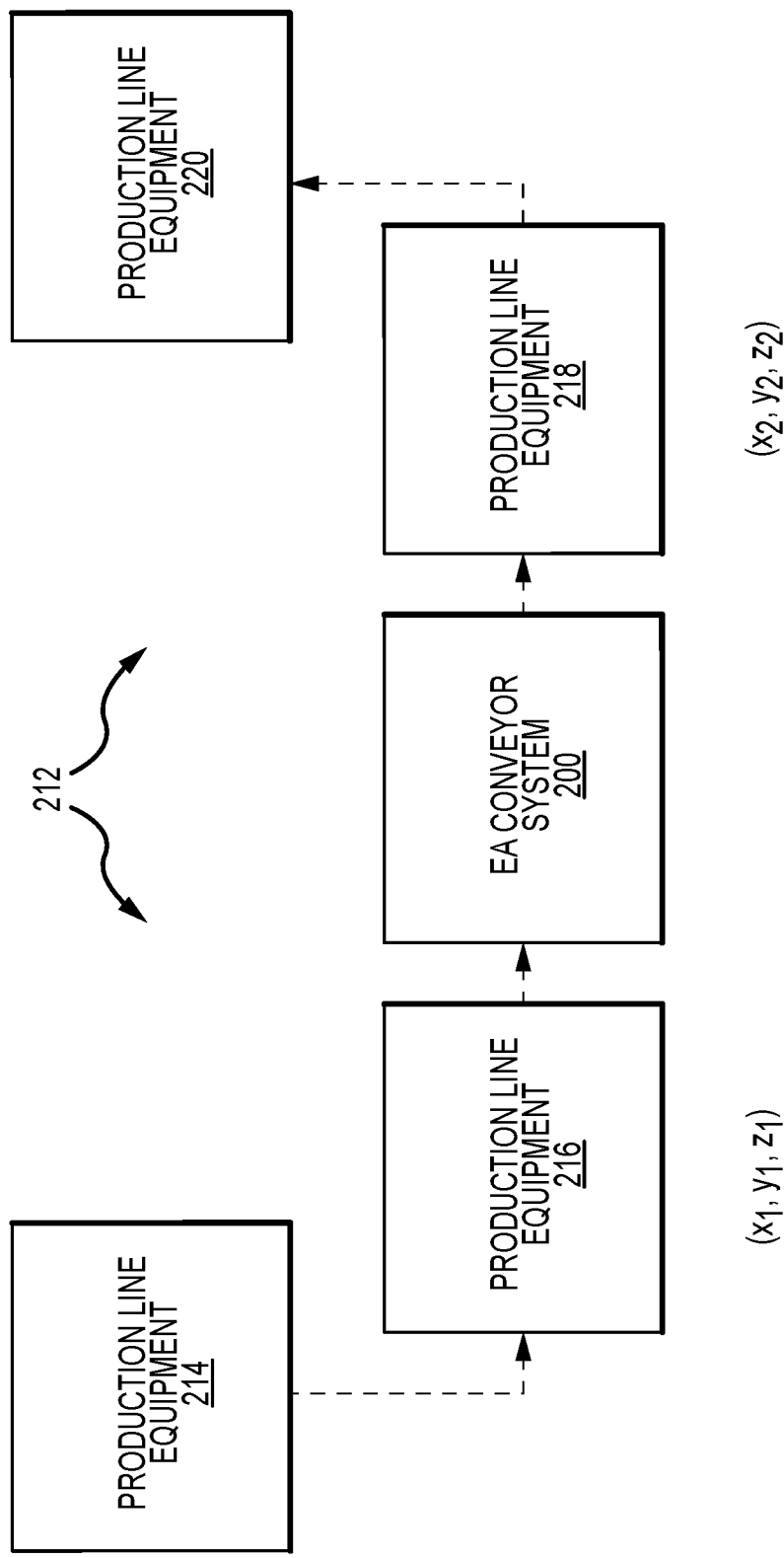
Figure 3:
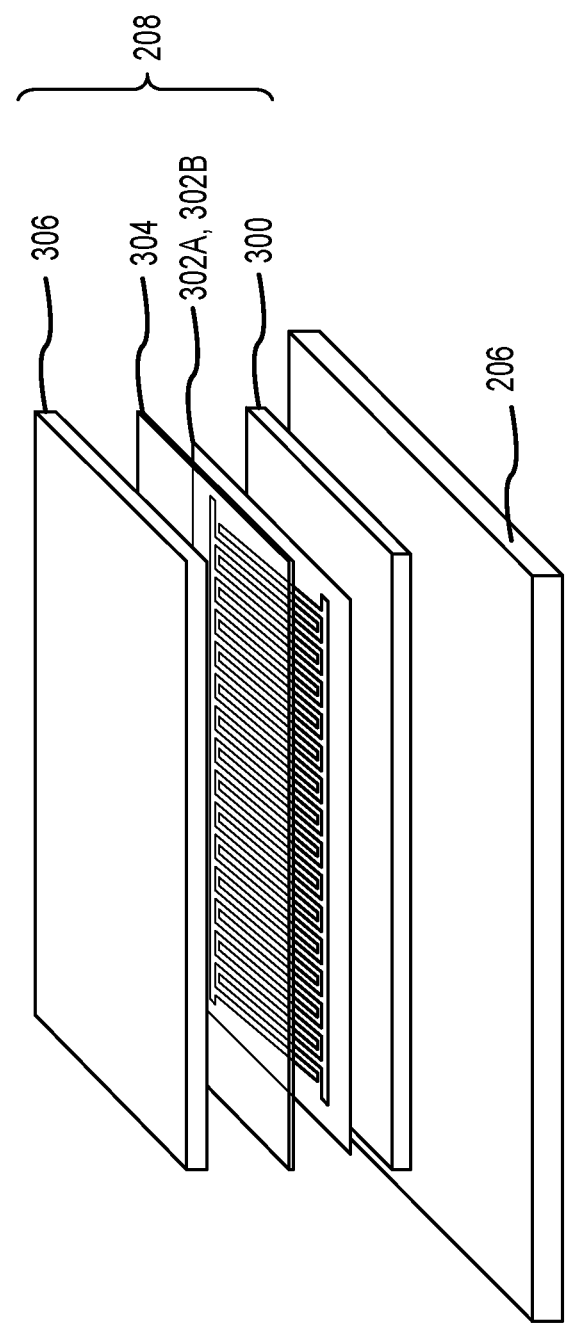
Figure 5:
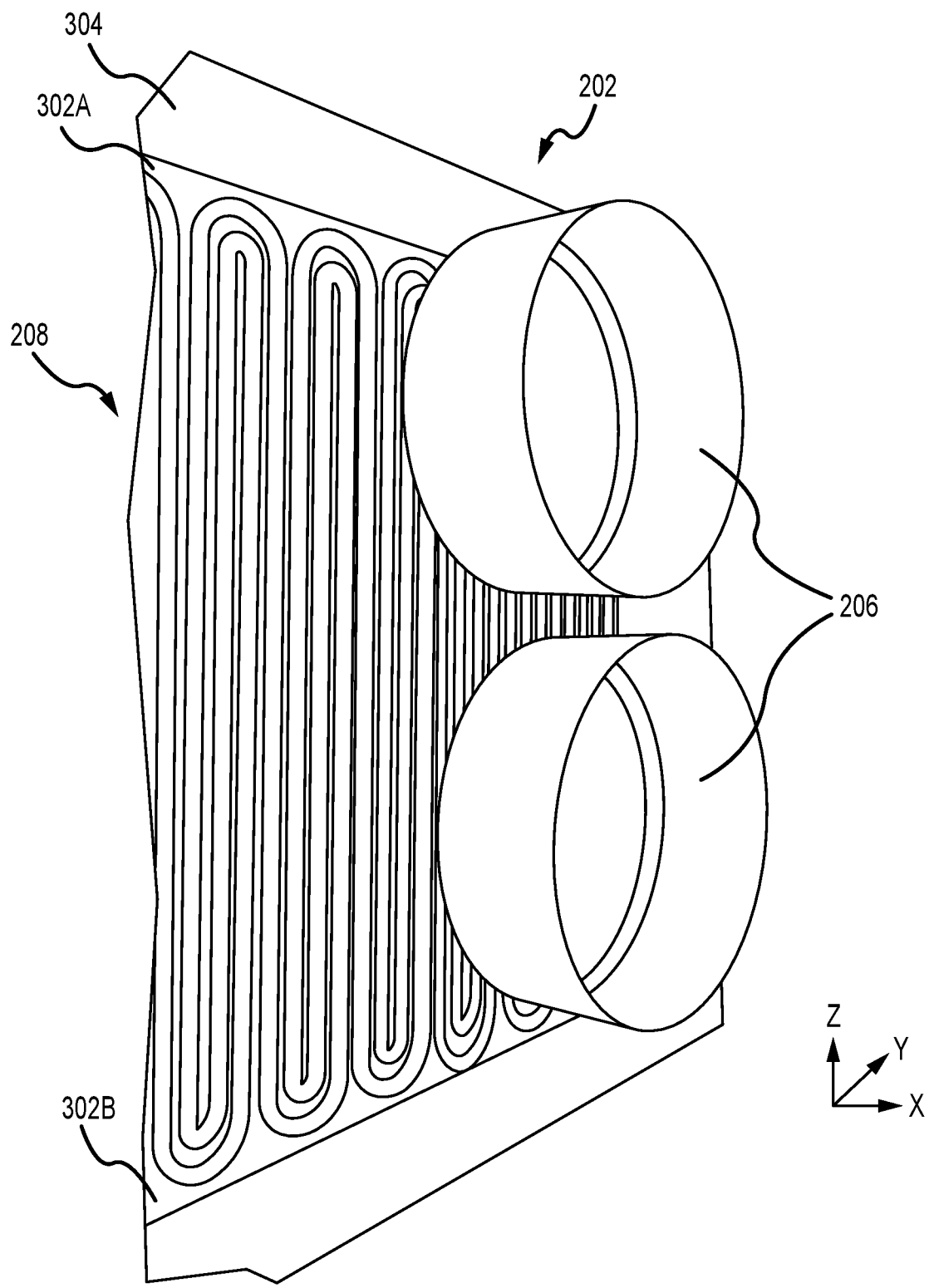
Figure 6A:
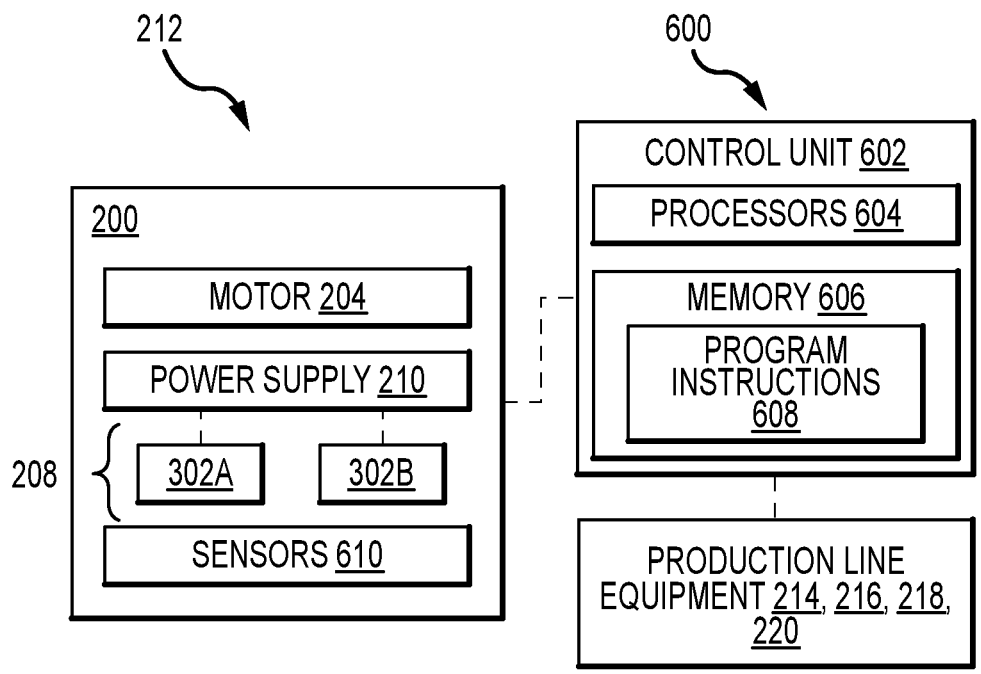
Figure 6B:
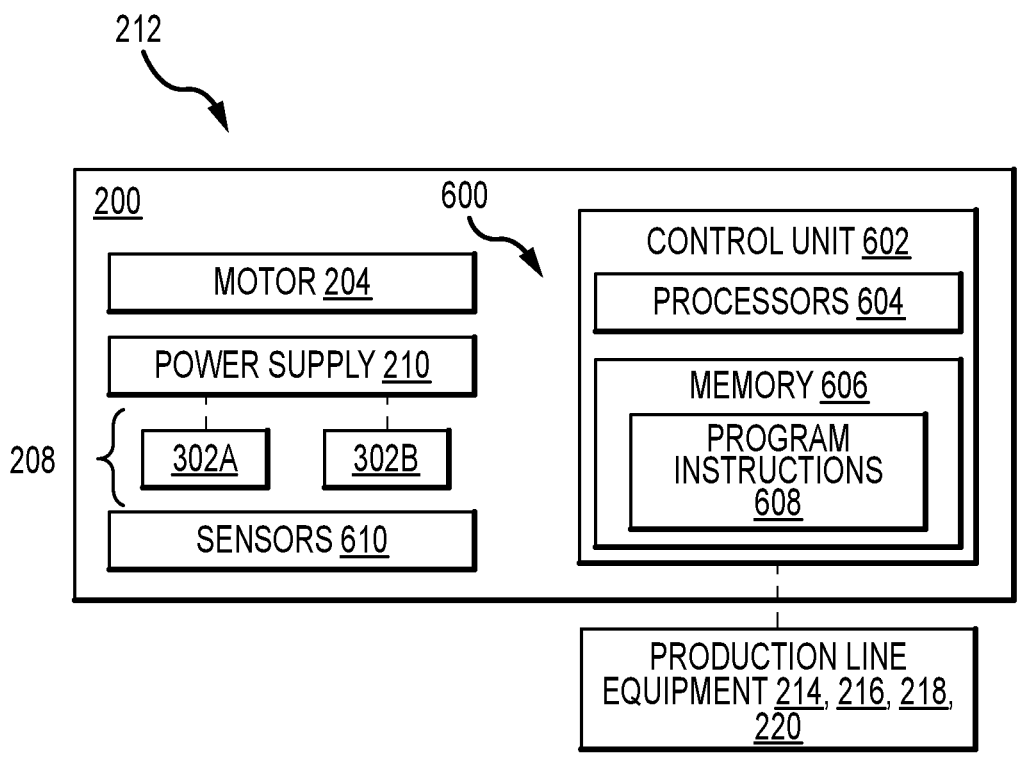
Figure 7:
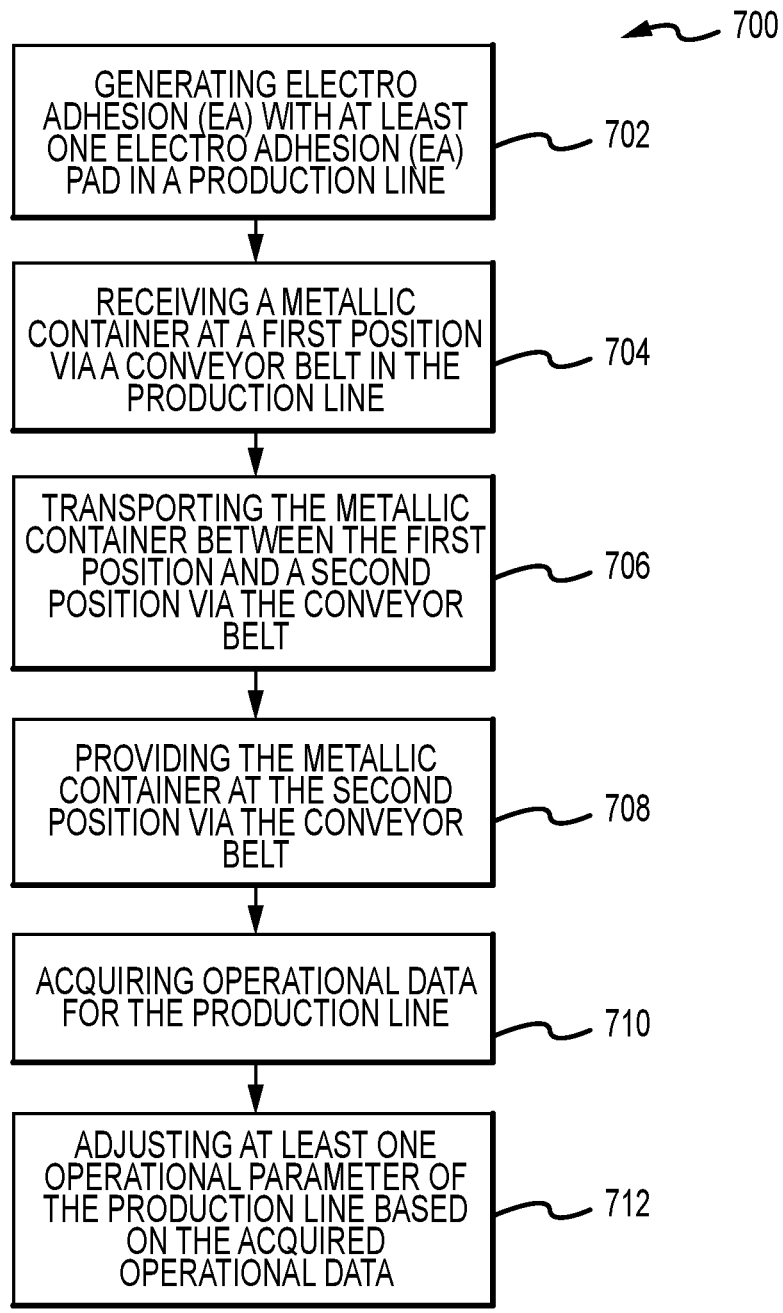

pad for transporting metallic containers from a first position to a second position, in accordance with one or more embodiments of the present disclosure;

FIG. 2B depicts a schematic view of a production line including equipment to perform operations on the metallic containers and an EA conveyor system for transporting metallic containers from a first position to a second position, in accordance with one or more embodiments of the present disclosure;

FIG. 3 depicts a substrate and an exploded perspective view of an EA pad, in accordance with one or more embodiments of the present disclosure;

FIGS. 4A-4E depicts example electrode patterns overlaid on dielectric filler in an EA pad, in accordance with one or more embodiments of the present disclosure;

FIG. 5 depicts metallic containers coupled to an EA pad set at a vertical orientation on a conveyor, in accordance with one or more embodiments of the present disclosure;

FIG. 6A is a schematic view of components of an EA conveyor system for transporting metallic containers in communication with a control system, in accordance with one or more embodiments of the present disclosure;

FIG. 6B is a schematic view of components of an EA conveyor system for transporting metallic containers including a control system, in accordance with one or more embodiments of the present disclosure; and FIG. 7 is a flow diagram of a method for transporting metallic containers using EA, in accordance with one or more embodiments of the present disclosure.

The drawings are not necessarily (but may be) to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

The following is a listing of components according to various embodiments of the present disclosure, and as shown in the drawings:

| Number | Component |
| --- | --- |
| 100 | Vacuum conveyor system |
| 102 | Metallic container |
| 104 | Conveyor belt200 Electro adhesion (EA) conveyor system |
| 202 | Conveyor belt |
| 204 | Conveyor belt motor |
| 206 | Metallic containers |
| 208 | Electro adhesion (EA) pad |
| 210 | High-voltage power supply |
| 212 | Production line |
| 214 | Production line equipment |
| 216 | Production line equipment |
| 218 | Production line equipment |
| 220 | Production line equipment |
| 300 | Base dielectric |
| 302 | Electrodes |
| 302A | Positive electrode |
| 302B | Negative electrode |
| 304 | Dielectric filler |
| 306 | Dielectric cover |
| 600 | Control system |

-continued

| Number | Component |
| --- | --- |
| 602 | Control unit |
| 604 | Processor |
| 606 | Memory |
| 608 | Program Instructions |
| 610 | Sensors |
| 700 | Method |
| 702, 704 | |
| 706, 708 | |
| 710, 712 | Method steps |

DETAILED DESCRIPTION

The present disclosure generally relates to methods and apparatus for transporting metallic containers using electro adhesion. In particular, the present disclosure relates to methods and apparatus of transporting metallic containers, metallic bottles, and/or metallic cups (e.g., including, but not limited to, tapered cups) using electro adhesion within production lines, while reducing electricity consumption and promoting sustainability in metallic container manufacturing facilities.

Embodiments of the present disclosure are directed to a conveyor belt operable to transport metallic containers using EA through a metallic container manufacturing facility. Embodiments of the present disclosure are also directed to a method for transporting metallic containers using EA. Embodiments of the present disclosure are also directed to a production line of a metallic container manufacturing facility with a conveyor belt operable to transport metallic containers using EA. Embodiments of the present disclosure are also directed to a control unit configured to control the transportation of metallic containers within the production line. Embodiments of the present disclosure are also directed to reducing electricity consumption and promoting sustainability within the metallic container manufacturing facility. Embodiments of the present disclosure are also directed to preventing contact between metallic containers caused by the application of external forces such as gravity.

Referring now to FIGS. 2A and 2B, an electro adhesion (EA) conveyor system 200 is generally depicted, in accordance with one or more embodiments of the present disclosure. In particular, FIG. 2A depicts the EA conveyor system 200, and FIG. 2B depicts a production line 212 including the EA conveyor system 200.

In at least one embodiment, the system 200 includes a conveyor belt 202. The conveyor belt 202 may comprise plastic, polyamide, nylon, glass fiber, polyethylene, rubber, or other suitable materials. In another embodiment, the conveyor belt 202 is driven by a conveyor motor 204. The conveyor belt 202 may be a continuous loop around rollers. For example, the rollers (or at least one of the rollers) may be powered by the conveyor motor 204 or unpowered. By way of another example, the conveyor belt 202 may include one or more intermediate rollers positioned between end rollers that provide support to the conveyor belt 202 between the end rollers. For instance, where there are multiple intermediate rollers, adjacent intermediate rollers may be spaced apart a predetermined distance, or may be touching or toleranced to include a non-interference gap between adjacent rollers. It is noted the intermediate rollers may assist in the support and transportation of the metallic containers 206 on a leading surface of the conveyor belt 202 from a first position to a second position, and/or assist in the returning of a trailing surface of the conveyor belt 202 after the metallic containers 206 are delivered to the second position. In addition, it is noted at least some of the end rollers and/or intermediate rollers may be coupled together and/or at least partially contained within a frame.

The conveyor belt 202 may range between 78 inches (6.5 feet) and 780 inches (65 feet) in length along the transportation surface, and between 3 inches and 80 inches in width across the transportation surface. It will be appreciated the specific length and width ranges are exemplary in nature, and the present disclosure encompasses any width or length usable for transporting metallic containers using EA. The conveyor motor 204 is coupled to mechanical, electrical, and/or electro-mechanical components including, but not limited to, reducers, shafts, sprockets or gears, or the like to transfer power from the conveyor motor 204 to move the conveyor belt 202. In another embodiment, the conveyor belt 202 is operable to move one or more metallic containers 206 from a first position A to a second position B.

In other embodiments, the system 200 includes one or more electro adhesion (EA) pads 208. The one or more EA pads 208 may be powered by one or more power supplies 210. For example, the one or more power supplies 210 may be an alternating current (AC) power supply. By way of another example, the one or more power supplies 210 may be a direct current (DC) power supply. In some embodiments, the EA conveyor system utilizes a wattage formed from current ranging between 1 μA and 1 mA, and a voltage ranging between 1 kV and 30 kV. In one non-limiting example, the voltage may range from 5 kV to 10 kV. It will be appreciated the specific current and/or voltage ranges are exemplary in nature, and the present disclosure encompasses any current and/or voltage usable for transporting metallic containers using EA.

It is noted that where there are multiple EA pads 208, the one or more power supplies 210 as depicted in FIG. 2A may be configured to provide voltage to the multiple EA pads 208 in a global setting (e.g., the strength or amount of electro adhesion of all EA pads 208 is adjusted simultaneously). In addition, it is noted that where there are multiple EA pads 208, the one or more power supplies 210 as depicted in FIG. 2A may be configured to provide voltage to the multiple EA pads 208 in a localized setting (e.g., the strength or amount of electro adhesion of only select EA pads 208 is adjusted).

In one example embodiment, the one or more EA pads 208 are separate from the conveyor belt 202. For example, the EA pad 208 may be located beneath a transportation surface of the conveyor belt 202 (e.g., that is positioned within a frame and/or positioned between the conveyor belt 202 and rollers). By way of another example, the EA pad 208 may be located between the leading surface of the conveyor belt 202 (e.g., the surface operable to transport the metallic containers 206 from the first position A to the second position B) and the trailing or returning surface of the conveyor belt 202 (e.g., the surface configured to roll underneath the leading surface and the one or more EA pads 208 to return from the second position to the first position A). In this example embodiment, the one or more EA pads 208 are stationary while the conveyor belt 202 moves around the stationary one or more EA pads 208. It is noted the various methods and/or components necessary to couple (e.g., physically, electrically, communicatively, or the like) the one or more power supplies 210 to the one or more EA pads 208 are understood to be contemplated without departing from the present disclosure In other example embodiments, the one or more EA pads 208 are positioned (e.g., located, incorporated, integrated, inserted, installed, or the like) into the conveyor belt 202. For example, the EA pads 208 may be a separate layer that is positioned between upper and lower conveyor belt surface layers, may be a separate layer that is coupled to an underside or an overside of a conveyor belt surface layer, may be embedded within a conveyor belt surface layer, may be printed on a surface of a conveyor belt, or the like. In these embodiments, the one or more EA pads 208 are or include circuitry that is flexible and is configured to move (e.g., rotate, translate, and/or a combination of rotation and translation) with the conveyor belt 202, driven by the conveyor motor 204. It is noted the various methods and/or components necessary to couple (e.g., physically, electrically, communicatively, or the like) the one or more power supplies 210 to the one or more EA pads 208 while the one or more EA pads 208 move with the conveyor belt 202 are understood to be contemplated without departing from the present disclosure.

It is noted the system 200 may include EA pads 208 with the same pattern or multiple different patterns along the length and/or across the width of the conveyor belt 202. As such, the above example embodiments should not be interpreted as being limited to a particular electrode pattern or arrangement of electrode patterns within the EA pads 208.

In at least some embodiments, the conveyor belt 202 is part of a production line 212, where the production line 212 includes equipment 214, 216, 218, 220. For example, the equipment 214, 216, 218, 220 may be as described throughout the present disclosure (e.g., related to cuppers, body-makers, ovens, washers, other conveyor belts 202, or other production line equipment). The conveyor belt 202 may be operable to move metallic containers 206 from the first position A to the second position B. For example, the metallic containers 206 may be moved from an outlet of production line equipment 216 (e.g., at the first position) to an inlet of the production line equipment 218 (e.g., at the second position) via the system 200. It is noted the first position and the second position may be at a same elevation, such that the metallic containers 206 travel in a horizontal or substantially horizontal direction. In addition, it is noted the first position may be at a different elevation that the second position. For example, the metallic containers 206 may travel along in an upward or downward sloped direction along an incline or decline, where the incline or decline forms either a plane or a curved surface. By way of another example, the metallic containers 206 may travel in a vertical or substantially vertical direction. In general, the conveyor belt 202 may be operable to transport the metallic containers 206 from a first position A having a first set of coordinates $(x_1, y_1, z_1)$ to a second position B having a second set of coordinates $(x_2, y_2, z_2)$, where any of $x_1$ and $x_2$, $y_1$ and $y_2$, and/or $z_1$ or $z_2$ are the same or different along a respective axis.

Although embodiments of the present disclosure in FIG. 2A illustrate the first position A being at a lower elevation (or lower z-value) than the second position B, it is noted herein the first position A may be at a higher elevation (or higher z-value) than the second position B without departing from the scope of the present disclosure.

The production line 212 may further include equipment 214 preceding equipment 216, and/or equipment 220 following equipment 218. Changes in the operation of the equipment 214, 216, 218, 220 may result in the need for changes in the operational parameters of the system 200 (e.g., the speed of conveyor belt 204, the amount of EA force generated by the one or more EA pads 208, or other operational parameters), as depicted and described further herein with respect to at least FIGS. 6A and 6B.

In some embodiments, the conveyor belt 202 may be configured such that the metallic containers 206 are received on a first horizontal or substantially horizontal portion at the first position A, which may or may not include EA pads 208 proximate to or integrated within the conveyor belt 202 to secure the metallic containers 206 to the conveyor belt 202. In addition, the conveyor belt 202 may be configured such that the containers 206 are released at the second position B from a second horizontal or substantially horizontal portion of the conveyor belt 202, which may or may not include EA pads 208 proximate to or integrated within the conveyor belt 202. Further, the EA pads 208 may be proximate to or integrated within the conveyor belt 202 along an inclining or declining portion of the conveyor belt 202 between the first position A and the second position B. It is contemplated, however, that the metallic containers 206 may be loaded onto or unloaded from an inclining or declining portion of the conveyor belt 202, depending on the positioning of the EA pads 208 proximate to or integrated within the conveyor belt 202, without departing from the scope of the present disclosure.

In general, it is noted that movement of the metallic containers 206 onto the conveyor belt 202 at the first position A may provide a non-damaging pushing force by contacting the metallic containers 206 already received by the conveyor belt 202 and moving the metallic containers 206 to be positioned above the EA pads 208, to provide an EA force to the metallic containers 206 (e.g., at an inclining or declining portion of the conveyor belt 202). In addition, it is noted that movement of the metallic containers 206 on the conveyor belt 202 prior to the second position B may provide a non-damaging pushing force by contacting the metallic containers 206 not positioned above (and thus not acted on by) the EA pads 208, causing the metallic containers 206 to leave the conveyor belt 202 at the second position B. However, it is contemplated that the metallic containers 206 may be loaded onto or may leave the conveyor belt 202 without an assistive pushing force from other metallic containers 206 being loaded on or unloaded from the conveyor belt 202, and that the movement of the conveyor belt 202 is sufficient to load the metallic containers 206 at the first position A and/or unload the metallic containers 206 at the second position B, without departing from the scope of the present disclosure.

Although not shown, it is contemplated the EA pads 208 may allow for the transfer of metallic containers 206 between adjacent conveyor belts 202 between production line 212 equipment, without departing from the scope of the present disclosure. It is noted that the EA pads 208 and the EA forces they provide may reduce/optimize the size of (or entirely eliminate the need for) transition plates or dead plates between the adjacent conveyor belts 202. In one non-limiting example, one or more EA pads 208 may be positioned at the ends of the conveyor belt 202, such that an EA force is provided along the length of and at the transition point between adjacent conveyor belts 202.

Figures 4A, 4B, 4C:
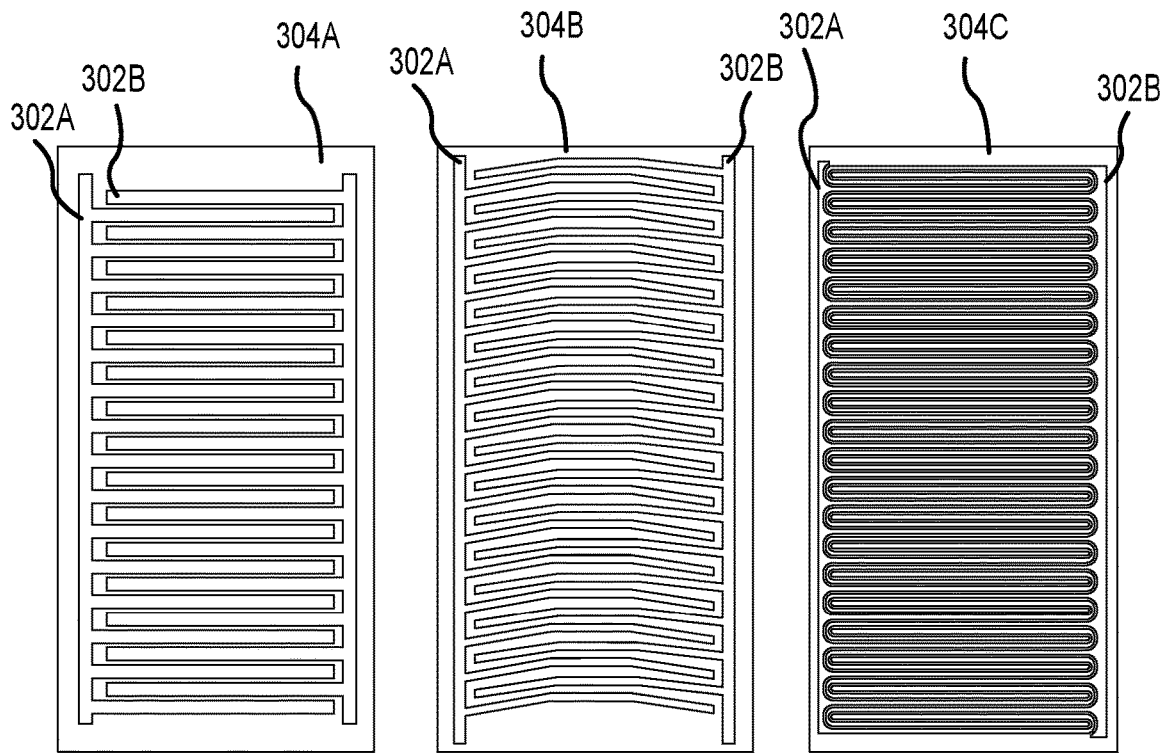
Figures 4D, 4E:
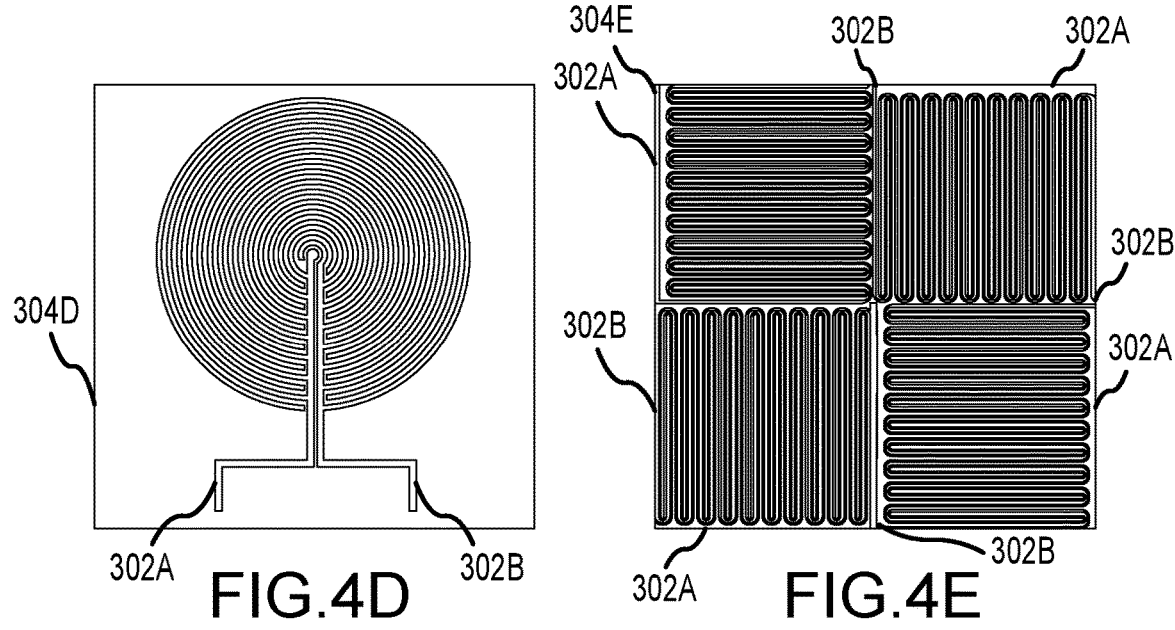

FIGS. 3-5 in general depict the EA pad 208, in accordance with one or more embodiments of the present disclosure. In particular, FIG. 3 depicts an exploded perspective view of an EA pad 208 according to at least one embodiment of the present disclosure. In addition, FIG. 4A-4E depict variations in electrode 302 patterns for the EA pad 208 according to embodiments of the present disclosure. Further, FIG. 5 depicts metallic containers 206 coupled to the EA pad 208.

Referring now to FIG. 3, in at least one embodiment the EA pad 208 includes a base dielectric 300, electrodes 302 including positive electrodes 302A and negative electrodes 302B, a dielectric filler 304, and the dielectric cover 306. For example, the positive electrodes 302A and negative electrodes 302B and the dielectric filler 304 may be positioned between the base dielectric 300 and the dielectric cover 306. Where the EA pad 208 is used with the conveyor belt 202, it is noted the conveyor belt 202 may operate as the base dielectric 300 and/or the dielectric cover 306. For example, where the conveyor belt 202 rotates about one or more stationary EA pads 208, the leading surface of the conveyor belt 202 and/or the returning surface may operate as the base dielectric 300 and/or the dielectric cover 306. By way of another example, where the one or more EA pads are positioned (e.g., located, incorporated, integrated, inserted, installed, or the like) within the conveyor belt 202, the conveyor belt 202 may operate as the base dielectric 300 and/or the dielectric cover 306. It is noted that FIG. 3 illustrates the EA pad 208 proximate to the substrate 206, which may include, but is not limited to, the metallic containers 206 or portions thereof. In some embodiments, the positive electrodes 302A and/or the negative electrodes 302B are in electric communication with (or electrically coupled to) the power supply 210. In other embodiments, the positive electrodes 302A and/or the negative electrodes 302B are in electric communication with (or electrically coupled to) a ground.

Referring now to FIG. 4A-4E, example patterns of electrodes 302 overlaid on the dielectric filler 304 are depicted. The pattern of electrodes 302 may be dependent on the scenario in which the one or more EA pads 208 may be implemented. For example, the electrodes 302 pattern may be selected based on parameters of the one or more EA pads 208 and/or the conveyor belt 202 including, but not limited to, length, width, height, angle of incline or decline, rate of incline or decline, curvature, or other dimensions. By way of another example, the pattern of the electrodes 302 may be dependent on desired levels of power draw or usage in maintaining EA forces during transportation of the metallic containers 206. It is noted designing the electrodes 302 pattern to adjust levels of power draw or usage may affect electricity consumption and promote sustainability in metallic container manufacturing facilities. In general, it is noted that the electricity consumption necessary to create the EA forces may be less than the electricity consumption necessary to provide a vacuum in a conventional vacuum conveyor system.

As illustrated in the example embodiment of FIG. 4A, electrodes 302A and 302B each include a strip running along a respective opposite edge of a dielectric filler 304A. Electrodes 302A and 302B additionally have alternating traces or branches projecting inward from the respective strips. For instance, the strips run approximately parallel to a longitudinal axis along a length of the dielectric filler 304 (or are axial), and the traces or branches project approximately perpendicular inward from the respective strips (or run transverse). In FIG. 4A, the traces or branches are substantially straight or linear.

As illustrated in the example embodiment of FIG. 4B, electrodes 302A and 302B each include a strip running along a respective opposite edge of a dielectric filler 304B. Electrodes 302A and 302B additionally have alternating traces or branches projecting inward from the respective strips. For instance, the strips run approximately parallel to a longitudinal axis along a length of the dielectric filler 304 (or are axial), and the traces or branches project approximately perpendicular inward from the respective strips (or run transverse). In FIG. 4B, the traces or branches are curved or non-linear.

As illustrated in the example embodiment of FIG. 4C, electrodes 302A and 302B each include a strip running along a respective opposite edge of a dielectric filler 304C. Electrodes 302A and 302B additionally have alternating traces or branches that project inward from the respective strips, form a loop, and project back outward toward the respective strips. For instance, the strips run approximately parallel to a longitudinal axis along a length of the dielectric filler 304 (or are axial), and the traces or branches project approximately perpendicular inward (and then outward) from the respective strips (or run transverse). In FIG. 4C, the traces or branches are straight or linear for at least a first portion, and curved or non-linear for at least a second portion.

As illustrated in the example embodiment of FIG. 4D, electrodes 302A and 302B each include a strip with at least a first section that runs substantially parallel to a longitudinal edge of a dielectric filler 304D, at least a second portion that runs substantially perpendicular to the longitudinal edge of the dielectric filler 304D, and at least a third portion that runs substantially parallel along a central axis of the dielectric filler 304D. Electrodes 302A and 302B additionally have alternating traces or branches that extend outwardly from the at least a third portion and form alternating circular patterns of varying radii and circumferences.

As illustrated in the example embodiment of FIG. 4E, a dielectric filler 304E includes multiple segments of electrodes 302A, 302B. In particular, each segment includes a similar pattern to that illustrated in FIG. 4C, which has been rotated about a central point in the dielectric filler 304E.

In one example, an EA pad may need to generate an EA force of a first magnitude to transport a container generally horizontally with a longitudinal axis of the container oriented generally vertically. When the container is transported on an incline, decline, or vertically (e.g., with the longitudinal axis of the container oriented generally horizontally as illustrated in FIG. 5), an EA pad might need to generate an EA force of a second magnitude that is greater than the first magnitude via a different electrode 302 pattern and/or a different voltage. This difference in magnitude of forces may be monitored and controlled by the control system 600 described herein to optimize the electricity consumption of the EA pad 208 (and system 200 in general).

As such, in at least one embodiment, a first conveyor belt 202 may include an EA pad 208 with electrodes 302 arranged in a first pattern to generate the EA force of the first magnitude for a horizontal portion of the first conveyor belt 202. The conveyor belt 202 may optionally include an EA pad 208 with electrodes 302 arranged in a different pattern to generate the EA force of the second magnitude for an inclined or vertical portion of the second conveyor belt 202. It is noted the voltages supplied to the different-patterned electrodes 302 may be the same or different, without departing from the scope of the present disclosure.

In addition, or in the alternative, the control system 600 may send a first signal to the power supply 210 to provide a corresponding first voltage to an EA pad 208 to generate the EA force of the first magnitude for a horizontal portion of the first conveyor belt 202. When the EA pad 208 is at the incline, decline, or vertical, the control system 600 may send a second signal to the power supply 210 to provide a second voltage to the EA pad 208 to generate the EA force of the second magnitude. For instance, the second voltage may be higher and result in a higher second magnitude of EA force as compared to the first voltage and first magnitude of EA force, respectively.

Referring now to FIG. 5, metallic containers 206 are depicted as being coupled to an EA pad 208 via EA forces. In the example pattern depicted in FIG. 5 (and as depicted in FIG. 4C), the positive electrode 302A and the negative electrode 302B each run along a side of the EA pad 208 and include alternating projections inward. The arrangement of the positive electrode 302A and the negative electrode 302B generates an electric field that sets up opposite charges on a substrate (here, the metallic containers 206). It is noted the one or more power supplies 210 as depicted in FIG. 2A may be configured to provide voltage to the positive electrode 302A and the negative electrode 302B in a global setting (e.g., all electrodes 302A or 302B are adjusted simultaneously). In addition, it is noted the one or more power supplies 210 as depicted in FIG. 2A may be configured to provide voltage to the positive electrode 302A and the negative electrode 302B in a localized setting (e.g., select electrodes 302A or 302B are adjusted).

One result, as depicted in FIG. 5, is that the EA pad 208 is able to hold the metallic containers 206 in a vertical or substantially vertical position when an EA field of a sufficient strength is generated. FIG. 5 generally illustrates the EA pad 208 oriented with its transport surface oriented generally parallel to a vertical axis. The metallic containers 206 each have a longitudinal axis which extends perpendicular to their respective closed ends. The EA pad 208 is configured to generate an EA field such that the metallic containers 206 are held against the EA pad with their longitudinal axes oriented perpendicular to the vertical axis (or generally parallel to the ground). In particular, the metallic containers 206 should be held in place with a sufficient EA field, even when in a vertical or substantially position, countering the application of external forces such as gravity during transportation that may cause the metallic containers to make contact or overturn, resulting in mashing, deforming, contact marks, or the like on the metallic containers when contact occurs. It is noted the EA pad 208 is not required to have a layer between the electrodes 302 and a substrate (here, the metallic containers 206) such as the dielectric cover 306, and/or in some instances the conveyor belt 202 (e.g., where the EA pad 208 is configured to be moved by a motor 204 is integrated in or forms the surface that is operable to transport the metallic containers 206). However, the addition of the layer may allow for the transportation of the substrate along the EA pad 208 without moving the EA pad 208 (e.g., where the EA pad 208 is not integrated in the transportation surface such as the conveyor belt 202, and the conveyor belt 202 moves along the EA pad 208). Further, it is noted there may be one or more layers of material between the electrodes 302, the conveyor belt 202, and/or the substrate (here, the metallic containers 206). In this regard, the conveyor belt 202 may operate as (or in addition to) the layer between the electrodes 302 and the substrate.

Referring now to FIGS. 6A and 6B, a control system 600 for transporting metallic containers with a control unit 602 is generally illustrated, in accordance with one or more embodiments of the present disclosure. In particular, FIG. 6A illustrates a schematic of the system 200 for transporting metallic containers in communication with the control system 600, where the control unit 602 is separate from the system 200. In addition, FIG. 6B illustrates a schematic of the system 200 for transporting metallic containers including the control system 600, where the control unit 602 is installed within the system 200.

In one embodiment, the control system 600 includes one or more control units or controllers 602. The one or more control units 602 may include a processor 604 and a memory 606 (e.g., a memory medium, memory device, or the like). The processor 604 may be configured to execute program instructions 608 maintained on or stored in the memory 606. It is noted the processor 604 of the one or more control units 602 may execute any of the various method or process steps described throughout the present disclosure. For example, the processor 604 may be configured to perform any of or all the steps of the methods or processes described through the present disclosure.

The one or more processors 604 may include any processor or processing element known in the art. For the purposes of the present disclosure, the term "processor" or "processing element" may be broadly defined to encompass, but is not limited to, any device having one or more processing or logic elements, e.g., one or more graphics processing units (GPU), micro-processing units (MPU), systems-on-a-chip (SoC), one or more application specific integrated circuit (ASIC) devices, one or more field programmable gate arrays (FPGAs), or one or more digital signal processors (DSPs). In this sense, the one or more processors 604 may include any device configured to execute algorithms and/or instructions, e.g., program instructions stored in memory 606. In one example embodiment, the one or more processors 604 may be embodied as a computer system configured to execute a program configured to operate in conjunction with components installed within the control units 602, and/or configured to operate in conjunction with multiple localized or global control units 602 either directly or via a third-party server.

The memory 606 may include any storage medium known in the art suitable for storing program instructions 608 executable by the associated one or more processors 604. For example, the memory 606 may include a non-transitory memory medium. By way of another example, the memory 606 may include, but is not limited to, a read-only memory (ROM), a random-access memory (RAM), a magnetic or optical memory device (e.g., disk), a magnetic tape, a solid-state drive, or the like. It is further noted that the memory 606 may be housed in a common control unit housing with the one or more processors 604. In one example embodiment, the memory 606 may be located remotely with respect to the physical location of the respective one or more processors 604. For instance, the respective one or more processors 604 may access a remote memory 606 (e.g., server), accessible through a network (e.g., internet, intranet, or the like).

Although not shown, the control system 600 may include a user interface coupled (e.g., physically coupled, electrically coupled, communicatively coupled, or the like) to the one or more control units 602. For example, the user interface may be a separate device coupled to the one or more control units 602. By way of another example, the user interface and the one or more control units 602 may be located within a common or shared housing. It is noted, however, the one or more control units 602 may not include, require, or be coupled to the user interface.

The user interface may include a display. For example, the display may include, but is not limited to, a liquid crystal display (LCD) or an organic light-emitting diode (OLED) based display, or other known display. By way of another example, the display may be backlit or non-backlit. Those skilled in the art should recognize that any display or display device capable of integration with a user interface is suitable for implementation in the present disclosure. It is noted the user interface may be touchscreen-capable and/or may be paired or otherwise connected with user input devices including, but not limited to, a keyboard, a mouse, or another toggle device (e.g., a lever, button, switch, or the like). In some embodiments, a user may input selections and/or instructions via the one or more user input devices, which may be unprompted or may be responsive to data displayed to the user via the one or more displays.

The one or more user input devices may include, but are not limited to, one or more button, toggles, switches, electrical contacts, or the like. In addition, the one or more user input devices may include, but are not limited to, a touch pad, a touch screen, or the like, which are integrated with the display. It is noted the user interface may be configured to receive input via the display and/or the user input device to record typed or transcribed user notes. In general, the one or more user interfaces may include any type of human-machine interface.

In another embodiment, the control system 600 includes one or more sensors 610. For example, the system 200 and/or the equipment 214, 216, 218, 220 within the production line 212 may include one or more sensors 610. The one or more sensors 610 may be configured to monitor the components of the system 200 and/or the equipment 214, 216, 218, 220 within the production line 212 to generate data or information, and provide the generated data or information to the one or more control units 602. For example, the data or information may include, but is not limited to, number of the metallic containers 206, volume of the metallic containers 206, speed of the metallic containers 206 or the conveyor belt 204 (or other devices, such as a twister for reorienting the metallic containers in the production line 212), change in height between the first position and second position during transportation of the metallic containers 206, operational information about the equipment 214, 216, 218, 220 within the production line 212 (e.g., which may affect the speed of the conveyor belt 204), energy consumption by one or more components of the system 200, or the like.

It is noted the components of (or in communication with) the production line 212 (e.g., the system 200, the equipment 214, 216, 218, 220, the control units 602, the sensors 610, or the like) may transmit data or information back and forth, creating feed forward and feedback loops within the system. For example, the system 200 or equipment 214, 216, 218, 220 may receive control signals from the control units 602. Upon processing of the control signals, the system 200 or equipment 214, 216, 218, 220 (or sensors 610 therein) may transmit information back to the control units 602 regarding the control signals, including viability or reproducibility (e.g., where the control signals may not result in a sufficient EA force, or the like). The control units 602 may then adjust the control signals accordingly.

The one or more control units 602 may control or adjust the operation of components within the system 200 and/or the production line 212 based on the data or information. It is noted herein the above example data and other data related to operational parameters may result in the adjustment of the amount of voltage applied to generate the EA forces, the strength of the EA forces, the electrode 302 pattern, or other operational parameters of the system 200 and its components. For example, the control system 600 may include a feedback loop or feed forward loop that may choose the best or optimal solution (e.g., with respect to amount of voltage applied, amount of EA force applied in the specific region of the conveyor belt, or other operational parameter) based on received input signals from the control system 600 or exterior signals. It is noted the feedback loop or feed forward loop may include, but is not limited to, an electrical circuit to identify energy use by area within the system 200 (e.g., localized control of a component or components) or a computer vision system configured to monitor and adjust across all or a part of the entire system 200 (e.g., globalized control).

For example, the one or more control units 602 may manipulate the EA force of the one or more EA pads 208 through control of the one or more power supplies 210. For instance, adjusting the voltage of the positive electrodes 302A and/or the negative electrodes 302B of the one or more EA pads 208 through the one or more power supplies 210 may cause the EA force of the one or more EA pads 208 to increase or decrease in relation to the metallic containers 206. The increase or decrease may cause the metallic containers 206 to more tightly or more loosely cling to the conveyor belt 202. This in turn will allow for the transportation of the metallic containers 206 in directions including, but not limited to, in a horizontal or substantially horizontal direction, in a sloped direction along an incline, decline, and/or in a vertical or substantially vertical direction.

As will be appreciated by one of skill in the art, adjusting the EA force of an EA pad 208 based on the orientation of the conveyor belt 202 will conserve energy. More specifically, in some transport orientations (such as when the conveyor belt 202 is transporting the metallic containers 206 with their longitudinal axes oriented vertically and with no changes in height), the EA pad 208 of the conveyor belt 202 can generate a first EA force of a first magnitude. In contrast, in other transport orientations such as when the conveyor belt 202 transports the metallic containers 206 with their longitudinal axes oriented horizontally or transports the metallic contains 206 from a first height to a second height, the EA pad 208 may generate a second EA force of a second magnitude that is greater than the first magnitude. The second EA force may require more electricity than the first EA force (e.g., to counter additional forces such as those caused by gravity that may cause the sliding of the metallic containers 206 relative to the EA pad 208 or conveyor belt 202). Accordingly, adjusting the amount of EA force generated by the EA pad 208 can conserve electricity.

By way of another example, the one or more control units 602 may manipulate the movement of the conveyor belt 202 through control of the conveyor motor 204. For instance, the one or more control units 602 may increase or decrease the speed of the conveyor motor 204 as required to assist in maintaining a desired amount of EA between the one or more EA pads 208 and the metallic containers 206. In addition, the one or more control units 602 may increase or decrease the speed of the conveyor motor 204 as determined based on the equipment 214, 216, 218, 220 to optimize the flow of the metallic containers 206 through the production line 212.

It is noted the components of (or in communication with) the production line 212 (e.g., the system 200, the equipment 214, 216, 218, 220, the control units 602, the sensors 610, or the like) may transmit and receive data in standardized data formats and/or non-standardized (or proprietary) data formats. For example, the standardized data format may be formatted for use with different operating systems including, but not limited to, Android, Apple iOS, Microsoft Windows, Apple macOS, Linux, ChromeOS, Unix, Ubuntu, or the like. Where different data formats are used, the components of (or in communication with) the production line 212 (e.g., the system 200, the equipment 214, 216, 218, 220, the control units 602, the sensors 610, or the like) may be configured to (1) convert the data from a first data format to a second data format prior to transmission and/or (2) convert the data from a first data format to a second data format following receipt of the data. It is noted that any number of data formats may be in use during the generation, transmission, reception, and/or implementation of information or data.

In addition, it is noted the one or more control units 602 that control the one or more power supplies 210 and the conveyor motor 204 may be the same control unit 602 within the control system 600 and/or the system 200. In addition, it is noted the one or more control units 602 that control the one or more power supplies 210 and the conveyor motor 204 may be different control units 602 within the control system 600 and/or the system 200.

FIG. 7 depicts a method 700 for transporting metallic containers in a production line 212, as performed by and/or on one or more components of the systems 200, 600 described in one or more embodiments throughout the present disclosure. The method 700 may include, but is not limited to, one or more of the following steps or embodiments. It is noted any components of any system-level or apparatus-level embodiment of the present disclosure may be configured to perform one or more of the following steps or embodiments, and vice versa.

In a step 702, the method may include, but is not limited to, generating electro adhesion (EA) with at least one EA pad 208 in the production line 212. The EA pad 208 may include one or more positive electrodes 302A and one or more negative electrodes 302B arranged in a predetermined pattern. The predetermined pattern may be configured to generate an electric field when a voltage is applied by a power supply 210 to one or more of the positive electrodes 302A or the negative electrodes 302B. For example, the predetermined pattern may include an alternating pattern of positive and negative electrodes. By way of another example, the predetermined pattern may include a ring or perimeter of negative electrodes surrounding positive electrodes (or both positive electrodes and negative electrodes).

In a step 704, the method may include, but is not limited to, receiving a metallic container 206 at or from a first position via a conveyor belt 202 in the production line 212. The conveyor belt 202 may be actuatable via a conveyor motor 204. The first position may be an output of a first piece of equipment 216.

In a step 706, the method may include, but is not limited to, transporting the metallic container 206 between the first position and a second position via the conveyor belt 202. The metallic container 206 is held against the conveyor belt 202 via said generated EA during transportation. For example, the metallic container 206 may be statically loaded by the EA pads 208 proximate to or integrated within the conveyor belt 202, where the static loading is created by the positive and negative charges of the EA pad 208 generating opposite charges on a surface of the metallic container 206, resulting in attraction between the EA pad 208 and the metallic container 206.

In a step 708, the method may include, but is not limited to, providing (or delivering) the metallic container 206 to the second position via the conveyor belt 202. The second position may be an input of a second piece of equipment 218.

In a step 710, the method may include, but is not limited to, acquiring operational data for the production line 212 via at least one control unit 602 communicatively coupled to the at least one sensor 610. For example, the data may be generated via at least one sensor 610 installed within the production line 212.

In a step 712, the method may include, but is not limited to, adjusting at least one operational parameter of the production line 212 based on the acquired operational data. For example, at least one control signal may be generated to adjust one or more operational parameters of at least one of the power supply 210 or the conveyor motor 204.

It is noted any methods described throughout the disclosure may include more or fewer steps or embodiments than those described. In addition, it is noted the steps or embodiments of any methods may be performed at any time (e.g., sequentially, concurrently, or simultaneously). Further, it is noted the steps or embodiments of any methods may be performed in any order, including in an order as presented in the disclosure and/or an order other than that presented in the disclosure.

Advantages of the present disclosure include a conveyor belt operable to transport metallic containers using EA through a metallic container manufacturing facility. Advantages of the present disclosure also include a method for transporting metallic containers using EA. Advantages of the present disclosure also include a production line of a metallic container manufacturing facility with a conveyor belt operable to transport metallic containers using EA. Advantages of the present disclosure also include a control unit configured to control the transportation of metallic containers within the production line. Advantages of the present disclosure also include reducing electricity consumption and promoting sustainability within the metallic container manufacturing facility. Advantages of the present disclosure are also directed to preventing contact between metallic containers caused by the application of external forces such as gravity.

In this regard, the present disclosure provides a solution to a long-felt but unsolved need regarding improved metallic container transportation within a production line of a manufacturing facility. Use of the one or more EA pads 208 in conjunction with conveyor belts 202 may eliminate the use of a conventional vacuum-based conveyor system within a production line for a metallic container 206. Replacing the conventional vacuum-based conveyor system with the EA pads 208 of the present disclosure may reduce electricity usage by the metallic container manufacturing facility housing the production line. In addition, replacing the conventional vacuum-based conveyor system with the EA pads 208 of the present disclosure may reduce the noise pollution caused by or within the metallic container manufacturing facility housing the production line. Further, replacing the conventional vacuum-based conveyor system with the EA pads 208 of the present disclosure may reduce maintenance of the production line equipment in the metallic container manufacturing facility, as the one or more EA pads 208 may require less preventative maintenance and be more easily repairable and/or replaceable than the equipment making up the vacuum-based conveyor system. Further, replacing the vacuum-based conveyor system with the EA pads 208 of the present disclosure may reduce the size of the metallic container manufacturing facility housing the production line, as the space within the manufacturing facility afforded to the vacuum-generating equipment and transfer system may not be required, resulting in a smaller footprint. As a result, the use of electro adhesion may result in increased sustainability efforts being achieved by or within the metallic container manufacturing facility housing the production line.

Although embodiments of the disclosure are directed to the transportation of metallic containers using electro adhesion, it is contemplated that the embodiments described throughout the present disclosure may be implemented to transport any item capable of being attracted via electro adhesion within a production line without departing from the scope of the present invention. As such, the embodiments described herein with respect to metallic containers should be considered illustrative and not be considered limiting.

While various embodiments of the system and method have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as, additional items. Further, it is to be understood that the claims are not necessarily limited to the specific features or steps described herein. Rather, the specific features and steps are disclosed as embodiments of implementing the claimed systems and methods.

What is claimed is:

1. An electro adhesion conveyor system for transporting a metallic container in a production line, comprising:
   an electro adhesion (EA) pad comprising at least one positive electrode and at least one negative electrode arranged in a predetermined pattern, said predetermined pattern configured to generate an electric field when a voltage is applied to one or more of said at least one positive electrode or said at least one negative electrode; and
   a conveyor belt that continuously transitions between a substantially horizontal leading surface and a substantially vertical leading surface, the conveyor belt positioned proximate to the EA pad and operable to transport the metallic container between a first position at a first elevation and a second position at a second elevation via the substantially horizontal leading surface and the substantially vertical leading surface of the conveyor belt, wherein the metallic container is held against said conveyor belt via EA generated by the EA pad during transportation of the metallic container between the first position and the second position.

2. The system of claim 1, further comprising:
   a conveyor motor configured to cause said conveyor belt to actuate, wherein actuation of said conveyor belt in combination with said electric field generated by said EA pad transports the metallic container between said first position and said second position.

3. The system of claim 2, further comprising:
   a power supply configured to apply said voltage to one or more of said at least one positive electrode or said at least one negative electrode.

4. The system of claim 3, wherein at least one of said power supply or said conveyor motor is adjustable based on at least one control signal generated by at least one control unit of a control system, said at least one control unit being communicatively coupled to at least one sensor installed within the production line, said at least one control signal being generated by said control unit based on operational data received from the at least one sensor.

5. The system of claim 4, wherein said first position corresponds to an output of a first piece of equipment of the production line operable to perform a first operation, wherein said second position corresponds to an input of a second piece of equipment of the production line operable to perform a second operation after the first operation, and wherein the at least one sensor is installed within or proximate to the first piece of equipment, the second piece of equipment, at least a third piece of equipment of the production line located upline from the first piece of equipment or downline from the second piece of equipment, or said conveyor belt.

6. The system of claim 1, wherein said EA pad is stationary, and wherein said conveyor belt is configured to move past said stationary EA pad when transporting the metallic container.

7. The system of claim 1, wherein said conveyor belt and said EA pad operate to retain the metallic container against the substantially vertical leading surface of the conveyor belt and transport the metallic container.

8. The system of claim 1, wherein said second elevation is an increased elevation or a decreased elevation relative to said first elevation, wherein said substantially vertical leading surface is a vertical leading surface, and wherein said conveyor belt is configured to transport the metallic container along the vertical leading surface.

9. The system of claim 8, wherein said conveyor belt is a closed loop formed with said substantially horizontal leading surface, said substantially vertical leading surface, and a return surface.

10. A method for transporting a metallic container via electro adhesion in a production line, comprising:
generating electro adhesion (EA) with an electro adhesion (EA) pad, said EA pad comprising at least one positive electrode and at least one negative electrode arranged in a predetermined pattern, said predetermined pattern configured to generate an electric field when a voltage is applied by a power supply to one or more of said at least one positive electrode or said at least one negative electrode;
receiving the metallic container from a first position at a first elevation via a conveyor belt that has an uninterrupted transition between a substantially horizontal leading surface and a substantially vertical leading surface, said conveyor belt being actuatable via a conveyor motor, said conveyor belt being positioned proximate to said EA pad;
transporting the metallic container between said first position and a second position at a second elevation via said conveyor belt, wherein the metallic container is held against said conveyor belt via said generated EA that is constantly generated during transportation of the metallic container; and
providing the metallic container at said second position via said conveyor belt.

11. The method of claim 10, further comprising:
acquiring operational data via at least one control unit; and
adjusting at least one operational parameter based on the acquired operational data.

12. The method of claim 10, wherein said first position corresponds to an output of a first piece of equipment of the production line operable to perform a first operation, wherein said second position corresponds to an input of a second piece of equipment of the production line operable to perform a second operation after the first operation.

13. A production line for transporting a metallic container via electro adhesion, comprising:
a first piece of equipment to perform a first operation;
a second piece of equipment adapted to perform a second operation after said first operation; and
an electro adhesion (EA) conveyor system for transporting the metallic container between a first position at a first elevation corresponding to said first piece of equipment and a second position at a second elevation corresponding to said second piece of equipment, said EA conveyor system comprising:
an electro adhesion (EA) pad comprising at least one positive electrode and at least one negative electrode arranged in a predetermined pattern, said predetermined pattern configured to generate an electric field when a voltage is applied to one or more of said at least one positive electrode or said at least one negative electrode; and
a conveyor belt including a substantially horizontal surface that transitions to a substantially vertical surface, the conveyor belt configured to transport the metallic container between said first position at the first elevation and said second position at the second elevation, wherein the metallic container is held against said conveyor belt via EA that is constantly generated by the EA pad during transportation of the metallic container along the conveyor belt.

14. The production line of claim 13, further comprising:
at least one sensor installed within or proximate to said first piece of equipment, said second piece of equipment, at least a third piece of equipment located upline from said first piece of equipment or downline from said second piece of equipment, or said EA conveyor system; and
a control unit of a control system, said control unit being communicatively coupled to said at least one sensor.

15. The production line of claim 14, said EA conveyor system further comprising:
a conveyor motor configured to cause said conveyor belt to actuate, wherein actuation of said conveyor belt in combination with said electric field generated by said EA pad transports the metallic container between said first position and said second position.

16. The production line of claim 15, said EA conveyor system further comprising:
a power supply configured to apply voltage to one or more of said at least one positive electrode or said at least one negative electrode.

17. The production line of claim 16, said control unit communicatively coupled to one or more of said conveyor motor or said voltage power supply, said control unit configured to generate at least one control signal to adjust at least one operational parameter of at least one of said power supply or said conveyor motor based on operational data received from said at least one sensor.

18. The production line of claim 13, wherein said EA pad is stationary, and wherein said conveyor belt is configured to move past said stationary EA pad when transporting the metallic container.

19. The production line of claim 13, wherein said EA pad is positioned within said conveyor belt, and wherein said conveyor belt and said EA pad both operate to retain the metallic container against the substantially vertical surface of the conveyor belt and transport the metallic container.

20. The production line of claim 13, wherein said second elevation is an increased elevation or a decreased elevation relative to said first elevation, wherein said substantially vertical surface is a vertical surface, and wherein said conveyor belt is configured to transport the metallic container along the vertical surface.

* * * * *